United States Patent
Dankberg et al.

(10) Patent No.: US 7,881,246 B2
(45) Date of Patent: Feb. 1, 2011

(54) COOPERATIVE ORTHOGONAL MULTI-SATELLITE COMMUNICATION SYSTEM

(75) Inventors: Mark D. Dankberg, Encinitas, CA (US); Charles N. Pateros, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 705 days.

(21) Appl. No.: 11/843,474

(22) Filed: Aug. 22, 2007

(65) Prior Publication Data

US 2008/0144596 A1 Jun. 19, 2008

Related U.S. Application Data

(60) Provisional application No. 60/823,126, filed on Aug. 22, 2006, provisional application No. 60/823,127, filed on Aug. 22, 2006, provisional application No. 60/823,128, filed on Aug. 22, 2006, provisional application No. 60/823,131, filed on Aug. 22, 2006.

(51) Int. Cl.
*H04B 7/216* (2006.01)
*H04L 12/56* (2006.01)

(52) U.S. Cl. ............... 370/315; 370/328; 370/401

(58) Field of Classification Search ............... 370/315, 370/328, 400, 401
See application file for complete search history.

(56) References Cited

U.S. PATENT DOCUMENTS

| | | | |
|---|---|---|---|
| 5,446,756 A | 8/1995 | Mallinckrodt | |
| 5,832,379 A | 11/1998 | Mallinckrodt | |
| 5,940,753 A | 8/1999 | Mallinckrodt | |
| 5,949,766 A | 9/1999 | Ibanez-Meier et al. | |
| 5,995,832 A | 11/1999 | Mallinckrodt | |
| 6,859,652 B2 * | 2/2005 | Karabinis et al. | 455/427 |
| 6,956,814 B1 | 10/2005 | Campanella | |
| 2002/0027957 A1 | 3/2002 | Paulraj et al. | |
| 2002/0050008 A1 | 5/2002 | Sloderbeck | |
| 2002/0061730 A1 | 5/2002 | Hart et al. | |
| 2002/0132579 A1 | 9/2002 | Hart et al. | |
| 2002/0136191 A1 | 9/2002 | Draim et al. | |
| 2003/0050008 A1 | 3/2003 | Patterson et al. | |
| 2004/0095907 A1 | 5/2004 | Agee et al. | |
| 2005/0227618 A1 * | 10/2005 | Karabinis et al. | 455/13.3 |
| 2006/0126750 A1 | 6/2006 | Friedman | |
| 2008/0143589 A1 | 6/2008 | Dankberg et al. | |
| 2008/0144734 A1 | 6/2008 | Dankberg et al. | |
| 2008/0214107 A1 | 9/2008 | Dankberg et al. | |
| 2010/0061293 A1 | 3/2010 | Schiff | |

* cited by examiner

*Primary Examiner*—John Pezzlo
(74) *Attorney, Agent, or Firm*—Townsend and Townsend and Crew LLP

(57) ABSTRACT

Satellite communication systems and methods are disclosed. The communication system may include a gateway in communication with two satellites. The satellites are configured to receive polarized signals from a first plurality of users and orthogonally polarized signals from a second plurality of users. Each satellite may transmit the polarized signals and the orthogonally polarized signals to the gateway. The first satellite may also receive first feeder signals from the gateway and transmit the first feeder signals to the first plurality of users and the second satellite may also receive second feeder signals from the gateway and transmit the second feeder signals to the second plurality of users.

17 Claims, 9 Drawing Sheets

COOPERATIVE ORTHOGONAL MULTI-SATELLITE COMMUNICATION SYSTEM

CROSS-REFERENCES TO RELATED APPLICATIONS

This application is a non-provisional, and claims the benefit, of commonly assigned U.S. Provisional Application No. 60/823,126, filed Aug. 22, 2006, entitled "Feeder Link Polarization Diversity," the entirety of which is herein incorporated by reference for all purposes.

This application is a non-provisional, and claims the benefit, of commonly assigned U.S. Provisional Application No. 60/823,127, filed Aug. 22, 2006, entitled "Downstream Broad Beam Diversity," the entirety of which is herein incorporated by reference for all purposes.

This application is a non-provisional, and claims the benefit, of commonly assigned U.S. Provisional Application No. 60/823,128, filed Aug. 22, 2006, entitled "Downstream Broad Beam Diversity With Interference Cancellation," the entirety of which is herein incorporated by reference for all purposes.

This application is a non-provisional, and claims the benefit, of commonly assigned U.S. Provisional Application No. 60/823,131, filed Aug. 22, 2006, entitled "Upstream Broad Beam Diversity," the entirety of which is herein incorporated by reference for all purposes.

This application is related to commonly assigned U.S. patent application Ser. No. 11/843,089, filed Aug. 22, 2007, entitled "Downstream Broad Beam Diversity," the entirety of which is herein incorporated by reference for all purposes.

This application is related to commonly assigned U.S. patent application Ser. No. 11/843,096, filed Aug. 22, 2007, entitled "Downstream Broad Beam Diversity With Interference Cancellation," the entirety of which is herein incorporated by reference for all purposes.

This application is related to commonly assigned U.S. patent application Ser. No. 11/843,429, filed Aug. 22, 2007, entitled "Upstream Broad Beam Diversity," the entirety of which is herein incorporated by reference for all purposes.

BACKGROUND OF THE INVENTION

This disclosure relates in general to satellite communications and, but not by way of limitation, to multi-satellite power limited communications.

Satellites are power limited. That is, satellites have a limited amount of power that must be used for communications, propulsion, processing, steering etc. Increasing the available power can be very expensive. Thus, satellite systems are often designed with tight power budgets. Providing increased power to a communication link can be very expensive. On the other hand, the quality of a communication link is proportional to the power of the communication link. Thus, a balance is often struck between quality and cost when considering power needs of a communication link.

Some satellites provide higher power forward service links and lower power return feeder links. For example, a satellite may provide 100 W forward service link and a 10 W return feeder link. Subscriber terminals are often small and have a broad beam and thus require higher power forward service link from the satellite. On the other hand, gateways often have large narrow beams that are pointed toward the satellite allowing for a lower power return feeder link.

Some satellites communicate with a gateway or subscriber terminals using right or left-hand polarized signals. Doing so allows a second satellite to operate within the same bandwidth and in the same geographic area using the opposite polarity without interfering with the first satellite and thus providing twice the bandwidth over a single satellite system. Other systems use other orthogonal signals other than right and left hand polarization.

There is a general need in the art to provide increases in the power of satellite communication links without greatly increasing the costs of the overall satellite system.

BRIEF SUMMARY OF THE INVENTION

A satellite communication system is provided according to one embodiment of the invention. The satellite communication system may include a gateway; a first satellite and a second satellite. The first satellite is configured to receive polarized signals from a first plurality of users and orthogonally polarized signals from a second plurality of users. The first satellite transmits the polarized signals and the orthogonally polarized signals to the gateway. The first satellite also receives first feeder signals from the gateway and transmits the first feeder signals to the first plurality of users. The second satellite is configured to receive polarized signals from the first plurality of users and orthogonally polarized signals from the second plurality of users. The second satellite transmits the polarized signals and the orthogonally polarized signals to the gateway. The second satellite also receives second feeder signals from the gateway and transmits the second feeder signals to the second plurality of users.

The first and second satellites may orbit within the same orbital slot or different orbital slots. The gateway may include two antennas. The first antenna is configured to receive the polarized signals from the first and second satellites, and a second antenna is configured to receive the orthogonally polarized signals from the first and second satellites. The polarized signals may be left-hand polarized and the orthogonally polarized signals may be right-hand polarized. Alternatively, the polarized signals may be right-hand polarized and the orthogonally polarized signals may be left-hand polarized.

In another embodiment of the invention, the gateway includes a first antenna configured to receive the polarized signals from the first satellite, a second antenna configured to receive the orthogonally polarized signals from the first satellite, a third antenna configured to receive the polarized signals from the second satellite, and a fourth antenna configured to receive the orthogonally polarized signals from the second satellite.

The polarized signals and the orthogonally polarized signals of embodiments of the invention may comprise spread spectrum signals. The signals may employ TDM, TDMA, CDMA, SCDMA, FDM, OFDM, WDM, FHSS, DSSS, or the like coding and/or access schemes.

A satellite communication method is also provided according to one embodiment of the invention. At a first satellite the method includes receiving polarized signals from a first plurality of users and orthogonally polarized signals from a second plurality of users and transmitting the polarized signals and the orthogonally polarized signals to a gateway. The method also includes, at a second satellite, receiving polarized signals from the first plurality of users and orthogonally polarized signals from the second plurality of users and transmitting the polarized signals and the orthogonally polarized signals to the gateway. First and second feeder signals may also be received at the first and second satellites respectively. The first satellite transmits the first feeder signal to the first plurality of users and the second satellite transmits the second feeder signals to the second plurality of users.

A gateway comprising two antennas is also provided according to one embodiment of the invention. The gateway includes a first antenna configured to receive polarized signals from both a first satellite and a second satellite and configured to transmit signals to the first satellite. The gateway also includes a second antenna configured to receive orthogonally polarized signals from both the first satellite and the second satellite and configured to transmit signals to the second satellite. The first antenna may be configured to transmit signals to a first plurality of users through the first satellite. The second antenna may be configured to transmit signals to a second plurality of users through the second satellite. The first and second satellites may be in the same orbital slot.

A gateway comprising four antennas is also provided according to one embodiment of the invention. The gateway includes a first antenna configured to receive polarized signals from a first satellite and a second antenna configured to receive orthogonally polarized signals from the first satellite. The gateway also includes a third antenna configured to receive polarized signals from the first satellite and a fourth antenna configured to receive orthogonally polarized signals from the second satellite. The first antenna and/or third antenna transmit feeder signals to the first satellite and the second antenna and/or fourth antenna transmit feeder signals to the second satellite. The first and second satellites may be in different orbital slots.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1A:
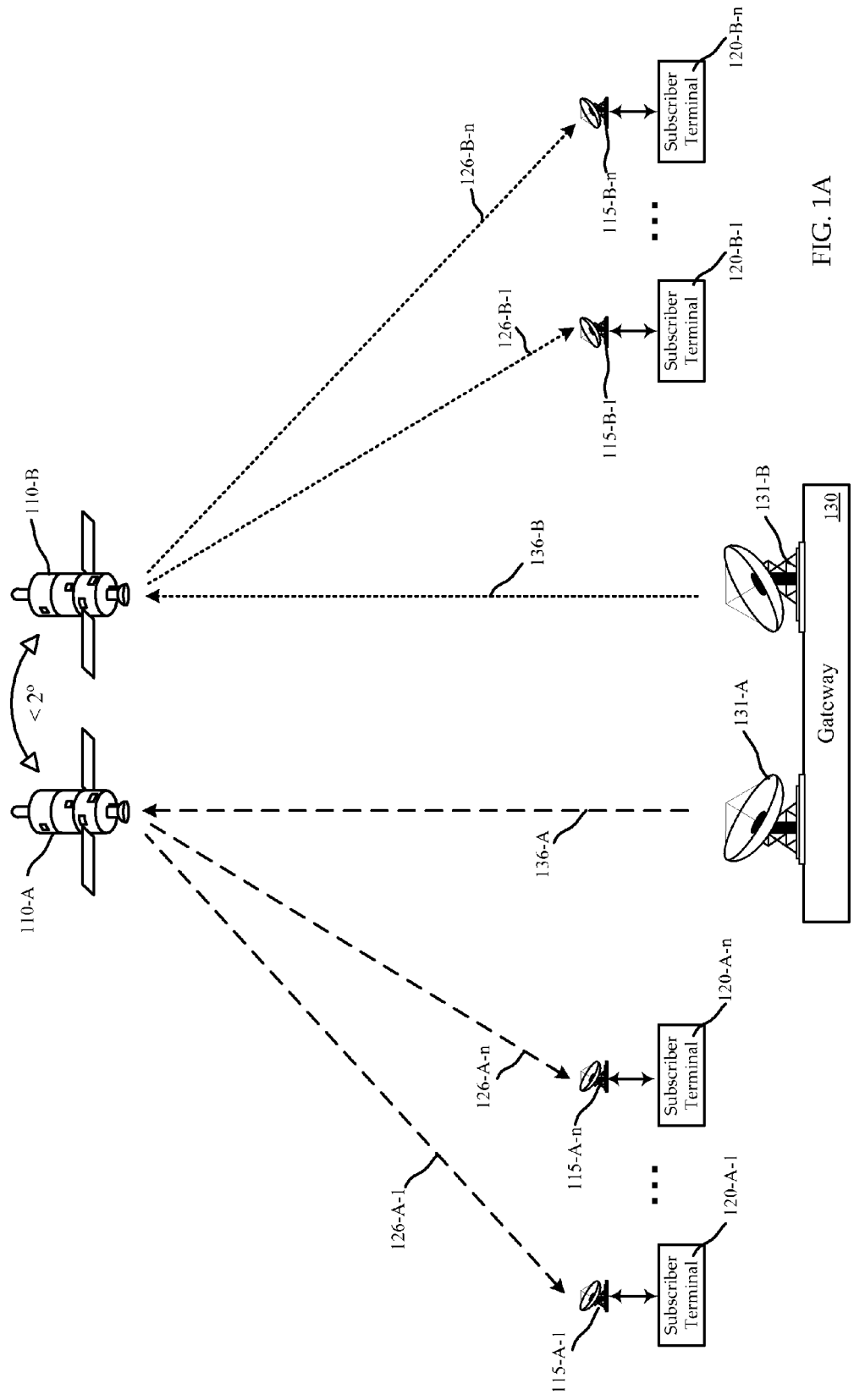
FIG. 1A shows the forward links of a satellite communication system according to one embodiment of the invention.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

In one embodiment, the present disclosure provides for satellite communication system comprising a gateway, a first satellite, and second satellite. The first and second satellite may be located in orbits that are close enough together that they can both receive signals transmitted by a first and second groups of subscriber terminals. The first group of subscriber terminals may receive and transmit signals in a first polarization and the second set of subscriber terminals may transmit and receive orthogonally polarized signals. The first satellite receives first signals through a first forward feeder link from the gateway and retransmits the first signals to the first group of subscriber terminals. The second satellite likewise receives second signals through a second forward feeder link from the gateway and retransmits the second signal to the second group of subscriber terminals. The first signals may be orthogonally polarized from the second signals.

The first subscriber terminals may transmit polarized return signals to both the first and second satellites. Likewise, the second subscriber terminals may transmit orthogonally polarized return signals to both the first and second satellites. Thus, both satellites may be equipped with antennas and/or antenna elements and receivers that receive polarized and orthogonally polarized signals from the first and second groups of subscriber terminals. For example, the polarized signals may be right-hand polarized and the orthogonally polarized signals may be left-hand polarized. The satellite antennas may also have a broad enough beam size in order to communicate with all or most of the subscribers within the first and second groups of subscriber terminals. The first and second satellites may retransmit the polarized signals and the orthogonally polarized signals to the gateway. Thus, two polarized links and two orthogonally polarized links are established with the gateway from the two satellites.

At the gateway, the composite polarized signals are received at a first antenna and the composite orthogonally polarized signals are received at a second antenna. The gateway may include a receiver at both antennas. These receivers may include circuitry that combines the composite signals into a single signal. Because of path differences, the signal received from the first satellite and the signal received from the second satellite may not be aligned in time. An iterative combiner or RAKE receiver (for example, with low auto-correlation direct sequence spread spectrum signaling) may be employed to properly combine the composite signals.

If each of the two satellites were only equipped to provide a single polarization return link, the return feeder link, for example, may provide only 10 W of power and the forward service links may provide 90 W of power. Using this embodiment of the invention the return feeder link is doubled by providing two satellites each with two 10 W feeder links.

Thus, with a small increase in the overall communication power budget, the return feeder link power may be doubled. With this example, the increase in power is only about 10%. but the increase in gain is double. Other examples may increase the power only 5%, for example if the forward link provides 95 W and the return link provides 5 W. Of course, the above mentioned power numbers are completely exemplary only. Various other power budgets may be used depending on the power usage of the return and feeder links. These numbers are used solely to show how a large increase in the return feeder link power may be provided with a small increase in satellite power use.

Another embodiment of the invention provides for a gateway with four antennas in communication with at least two satellites. Each of the two satellites provide polarized and orthogonally polarized return feeder link signals in communication with two of the four gateway antennas. These satellites may be within the same or different orbital slots, but far enough apart in order for individual antennas at the gateway to communicate with a single satellite. Accordingly, the first satellite provides a polarized feeder link with a first gateway antenna and an orthogonally polarized feeder link with a second gateway antenna. The second satellite provides a polarized feeder link with a third gateway antenna and an orthogonally polarized feeder link with a fourth gateway antenna. The like polarized signals may be combined at the gateway. In this embodiment, the separated signals can be iteratively combined using previously disclosed techniques, taking into account that the path delays will generally be many symbols long.

FIG. 1A shows the forward links of a satellite communication system according to one embodiment of the invention. A gateway 130 with two antenna 131-A, 131-B may be coupled with a network (not shown), for example, the Internet. The gateway 130 uses two satellite antennas 131-A, 131-B to bi-directionally communicate with satellites 110-A, 110-B on a feeder link. The forward feeder links 136 communicate information from the gateway 130 to the satellites 110. The first feeder link 136-A, in this embodiment, is right-hand polarized and the second feeder link 136-B is left-hand polarized. While right and left-hand polarization is used to describe this embodiment of the invention, other orthogonality schemes may be employed. Although not shown, there may be a number of gateways 130 in the system.

The satellites 110 may perform switching of signals from the gateway or be a bent-pipe that forwards signals from the gateway to the subscriber terminals 120 and vice versa. Information may bi-directionally pass through each satellite 110. The satellites 110 could use one or more antennas or a phased array when communicating with either the gateway or user terminals. The satellites 110, in this embodiment, are within less than 2° of each other. That is, the satellites may be within the same orbit slot. As shown, the first satellite 110-A communicates with the gateway through first antenna 131-A and the second satellite 110-B communicates with the gateway through the second antenna 131-B. The two satellites communicate over independent service links with a first and second group of subscriber terminals. Because the two satellites 110 are within the same orbital slot, the two satellites 110 may be seen by both antennas 131 at the gateway 130. The first gateway antenna 131-A communicates with the first satellite 110-A using a first signal 136-A that is polarized in one sense, for example right-handed, and the second gateway antenna 131-B communicates with the second satellite 110-B using a second link 136-B that is polarized in the opposite sense, for example left-hand polarized.

As shown in the figure, the first satellite 110-A communicates with a first group of user terminals 120-A using a first downlink signal 126-A and the second satellite 110-B communicates with a second group of user terminals 120-B using a second downlink signal 126-B. Each user terminal 120 may include an antenna 115 or various antenna elements. The first downlink signal 126-A may be right-hand polarized and the second downlink signal 126-B may be left hand polarized or vice versa. The antennas 115-A, according to this embodiment of the invention, at the first group of subscriber terminals may be right-hand polarized and the antennas 115-B at the second group of subscriber terminals may be left-hand polarized.

Communication data to and from the satellites may be focused into narrow beams that are focused on a localized geographic areas; for example, a large metropolitan area. Similarly, the communication data may be focused into broad beams that cover large geographic areas, for example, the continental US (CONUS). The data may also be communicated using both narrow beams and broad beams.

The downlink signals 126 from the satellites 110 may be comprised of a broadcast component that is sent to all subscriber terminals within a broad beam and a plurality of regional or narrow beam data that are transmitted only to subscriber terminals 120 within a specific narrow beam. Narrow beams may be directed toward a specific geographic locality. For example, the first satellite 110-A may communicate with subscriber terminals 120-A within one geographical location and the second satellite 110-B may communicate with subscriber terminals 120-B within a second geographic area. In another embodiment, the geography of the first group of subscriber terminals 115-A and the second group of subscriber terminals 115-B may overlap or cover the same geographic area. Data within the broad and narrow beams may be sent using a modulation scheme such as, for example, TDM, FDM, OFDM, CDMA, a combination of the two, a spread spectrum scheme or a similar multiplexing scheme. The data within the broad and narrow beams may use the same carrier frequency and/or frequency band.

The subscriber terminals 120 in this embodiment may be bi-directionally coupled to the satellites 110 to provide connectivity with the gateway 130. Each subscriber terminal 120 can receive information through the downlink signal 126 from the satellites 110. The subscriber terminals include antennas that may have a small aperture and/or a large beam width.

Subscriber terminals 120 may have multiple antennas coupled with a single receiver. The subscriber terminal 120 can be in a fixed or nomadic location, or can be mobile. In this embodiment, the subscriber terminal 120 interacts with a single transceiver in one or both of the satellites 110. Other embodiments could allow the subscriber terminal 120 to interact with multiple transceivers that may communicate with orbital or non-orbital assets (e.g., air, ground or sea based). Some embodiments of the subscriber terminal 120 allow switching between these modes.

A network (not shown) may be connected with the gateway 130 and may be any type of network and can include, for example, the Internet, an IP network, an intranet, a wide-area network ("WAN"), a local-area network ("LAN"), a virtual private network, the Public Switched Telephone Network ("PSTN"), a cluster of computers, and/or any other type of network supporting data communication between devices described herein, in different embodiments. A network 120 may include both wired and wireless connections, including optical links. Many other examples are possible and apparent to those skilled in the art in light of this disclosure. As illustrated in a number of embodiments, the network may connect the gateway 130 with other gateways (not pictured), which are also in communication with satellites 110.

Figure 1B:
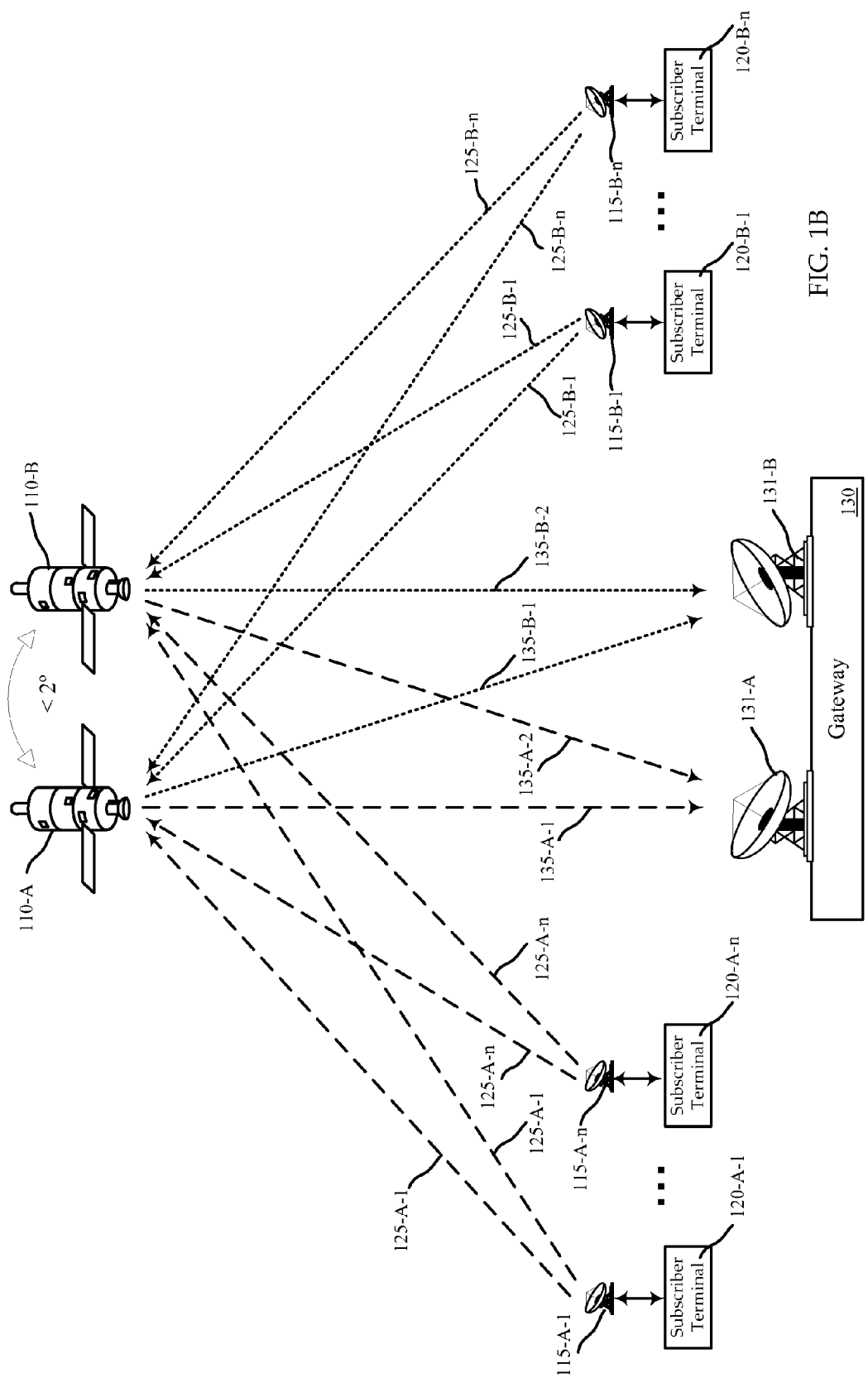
FIG. 1B shows the return links of a satellite communication system according to on embodiment of the invention.

FIG. 1B shows the return links of a satellite communication system according to one embodiment of the invention. Both the first group of subscriber terminals 120-A and the second group of subscriber terminals 120-B send data to both the first and second satellites 110 using return service links 125. According to this embodiment of the invention, the signals from the first group of subscriber terminals 120-A may be right hand polarized and the signals from the second group of subscriber terminals 120-B may be left hand polarized. Both satellites 110 are equipped with antennas that may receive both the right-hand polarized signals and the left-hand polarized signals.

Each satellites 110 may then transmit the both the right and left-hand polarized signals to the gateway 130 using return feeder links 135. The two antennas 131 at the gateway may be pointed and/or have a broad enough beam to receive signals from both satellites. At the gateway, the right-hand polarized signals may be received by a first antenna 131-A and the left-hand polarized signals may be received by a second antenna 131-B. Thus, the gateway receives data from the first group of subscriber terminals 115-A from both satellites 110-A, 110-B and data from the second group of subscriber terminals 115-B may also be received from both satellites 110-A, 110-B. Thus, the signals received at the gateway from both satellites may have increased gain over signals received from a single satellite. In some cases this increased gain may be double.

Figure 2:
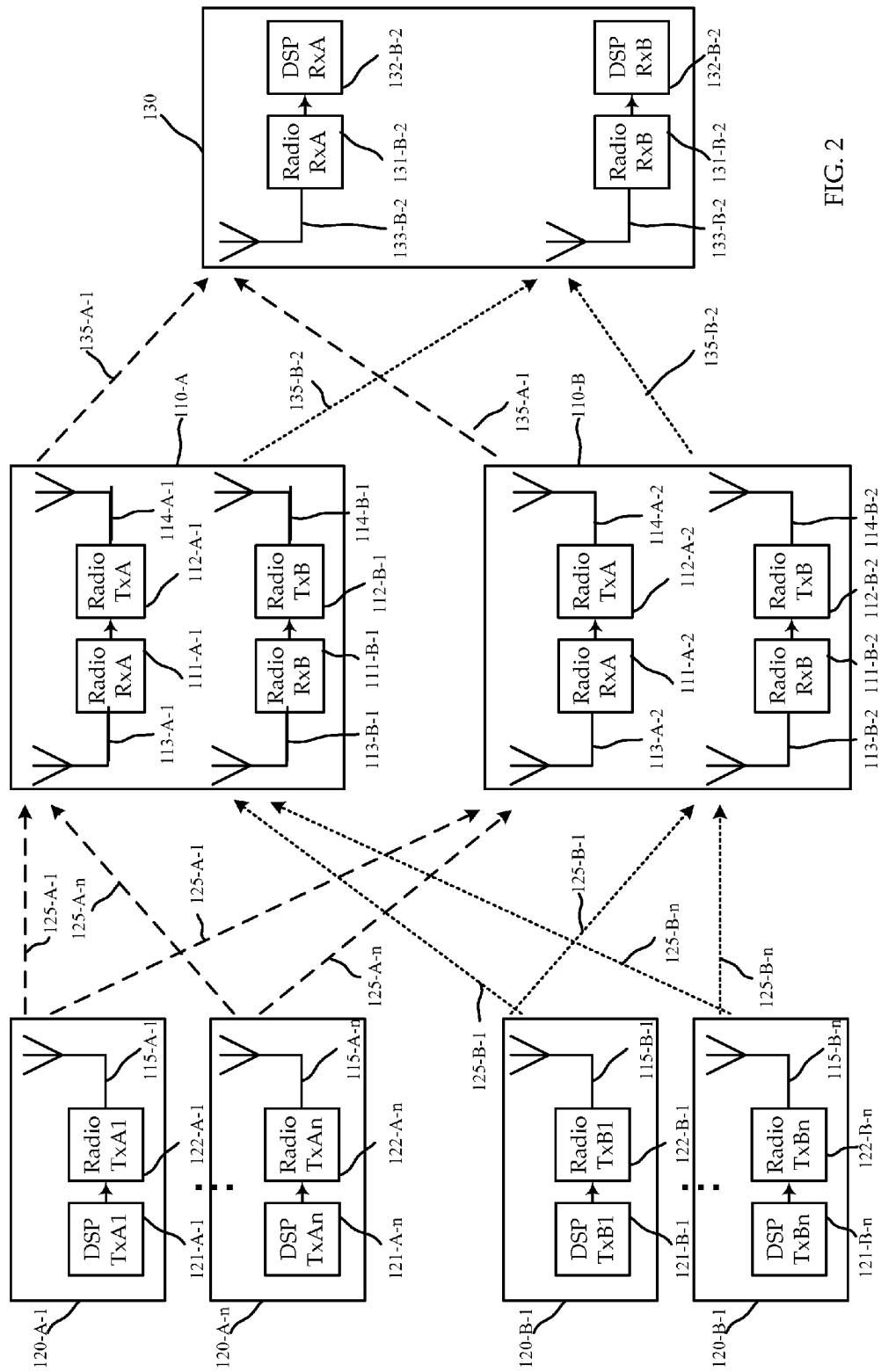
FIG. 2 shows a block diagram of the return links of the satellite communication system shown in FIG. 1B according to one embodiment of the invention.

FIG. 2 shows a block diagram of the return path portion of a satellite communication system shown in FIG. 1B according to one embodiment of the invention. The block diagram shows a digital signal processor 121 coupled with a radio 122 and antenna 115 as part of each subscriber terminal 120. The satellites 110 are also shown as bent pipe systems. In other embodiments, the satellites may provide switching and/or other signal processing. Signals are received from the subscriber terminals 120 at a receiver radio 111 coupled with an antenna 113 and retransmitted via a radio 112 and antenna 114. As shown, each satellite 110 includes two receiver-transmitter pairs, one for the right hand polarization and one for the left hand polarization. In other embodiments, the satellite may also include processing and/or switching between the receiving radio and the transmitting radio. The gateway is also shown with two antennas 133 each coupled with a radio 131 and signal processor 132.

Figure 3:
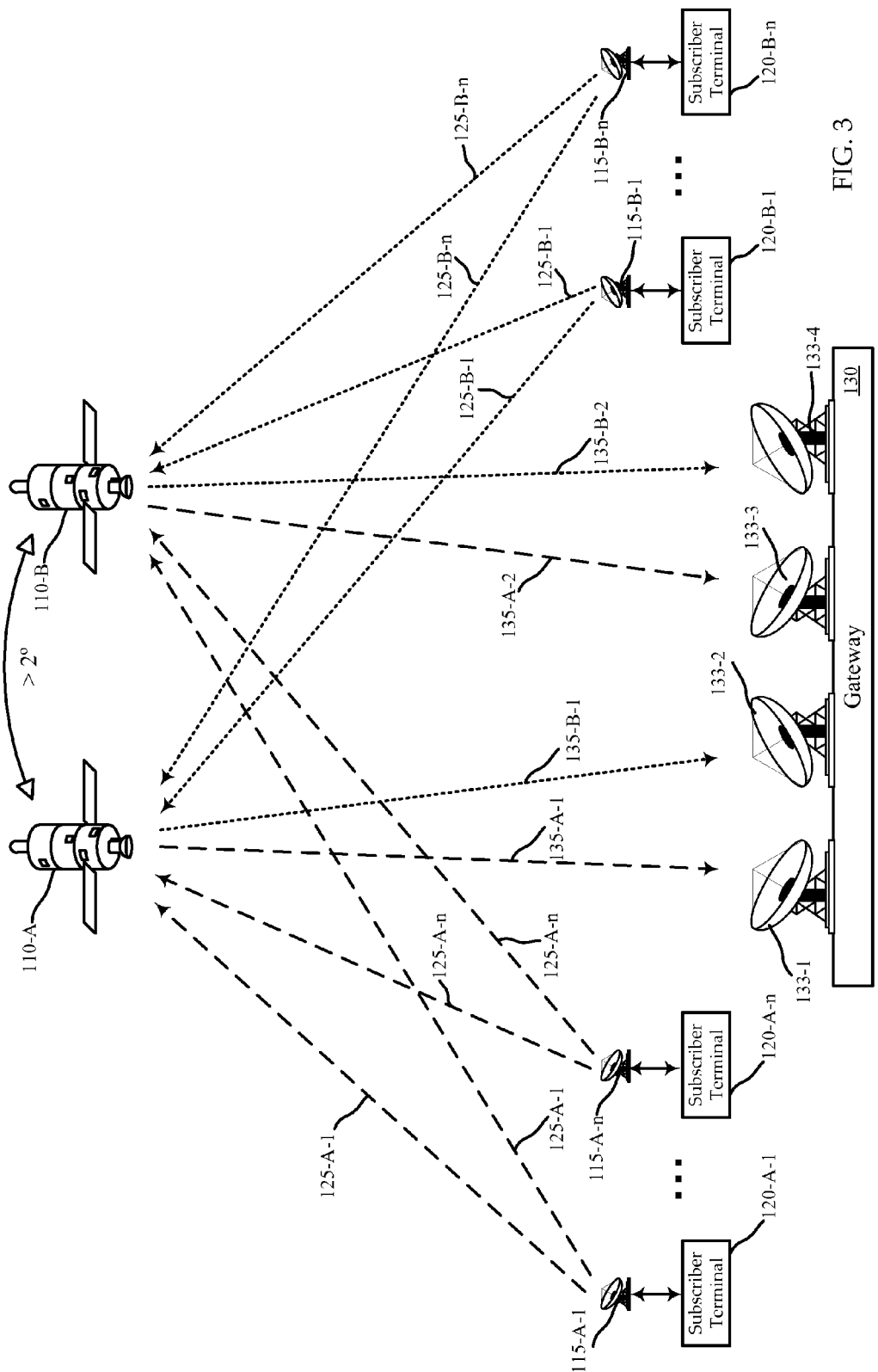
FIG. 3 shows a satellite communication system with four antennas at the gateway according to one embodiment of the invention.

FIG. 3 shows the return path portion of a satellite communication system with four antennas at the gateway according to one embodiment of the invention. According to this embodiment of the invention, the satellites 110 are far enough apart that the antennas 133 at the gateway cannot see both satellites simultaneously. For example, the satellites may be in different orbital slots. The first antenna 133-1 receives right hand polarized signals 135-A-1 from the first satellite 110-A. The second antenna 133-2 receives left-hand polarized signals 135-B-1 from the first satellite 110-A. The third antenna 133-3 receives right hand polarized signals 135-A-2 from the second satellite 110-B. The fourth antenna 133-4 receives left-hand polarized signals 135-B-2 from the second satellite 110-B. Thus, each satellite provides right and left hand polarization links to the gateway though four antennas.

Figure 4:
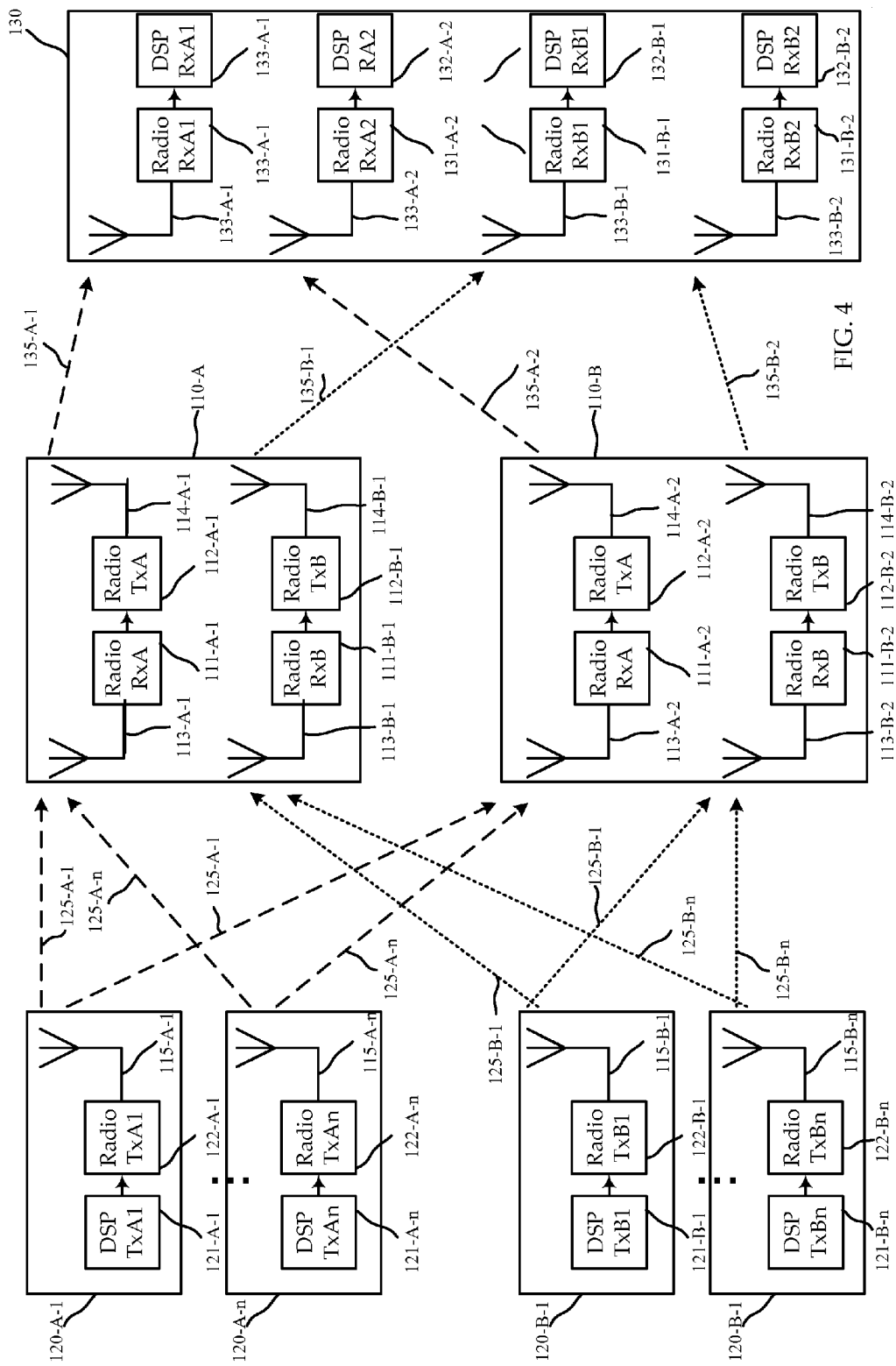
FIG. 4 shows a block diagram of the return links of the satellite communication system shown in FIG. 3.

FIG. 4 shows an exemplary block diagram of the satellite communication system shown in FIG. 3. The block diagram is similar to the block diagram shown in FIG. 2, except the gateway now has four antennas 133, radios 131 and signal processors 132.

Figure 5:
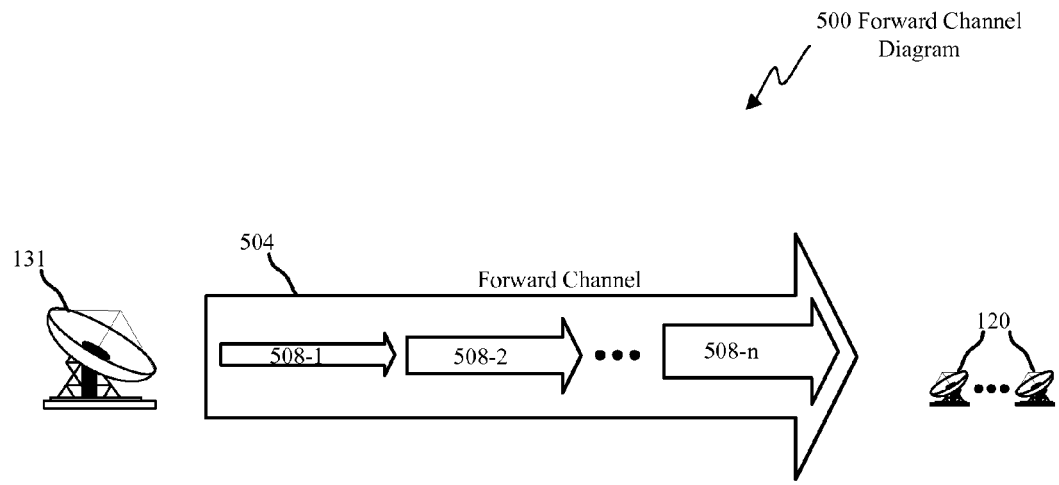
FIG. 5 shows the forward or downstream channel from a gateway to subscriber terminals according to another embodiment of the invention.

FIG. 5 the forward or downstream channel 500 from the gateway 115 to the subscriber terminals 120 according to another embodiment of the invention. All subscriber terminals 120 may receive the forward channel 504 from a first or second satellite. A fixed symbol rate channel is shared by the different subscriber terminals 130 in this embodiment. However, different consumers could be sent data at different modulation and codepoints depending on their operating signal to noise ratios. Each sub-channel or queue block 208 of the forward channel 204 is destined for a particular subscriber terminal 130 and is denoted by an arrow within the larger arrow of the forward channel 204. Arrows of different sizes convey the differences in coding and modulation that can be done for each sub-channel 208.

Figure 6:
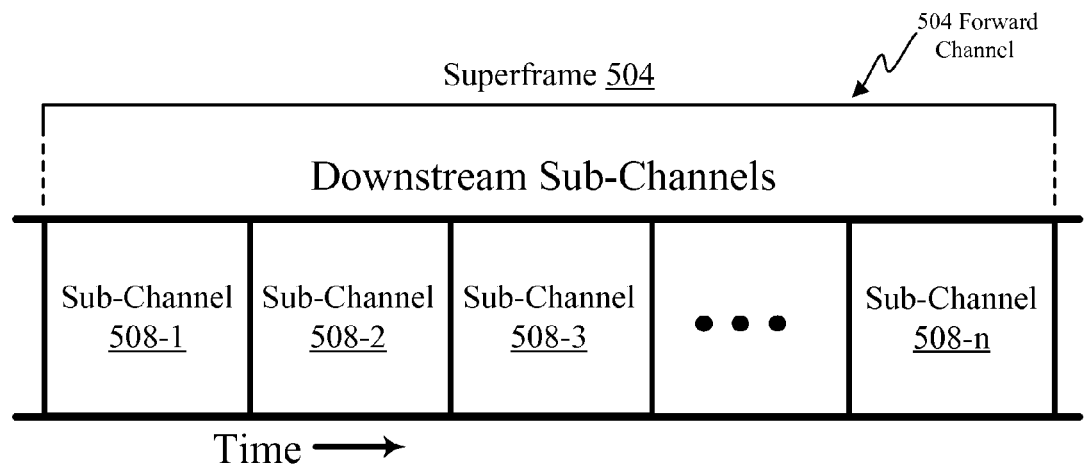
FIG. 6 shows a variable length superframe structure that may be used to send data on the downstream link according to another embodiment of the invention.

As shown in FIG. 6, the system uses a variable length superframe 504 structure to send data on the downstream. Thus, each superframe 504 may include header and framing overhead (not shown) and data intended for different consumers such that every subscriber terminal 120 may receive its own sub-channel 508. In some embodiments, the size of the sub-channels 508 and superframe 504 can vary. For example, the superframe 504 might include two sub-channels 508 each of which contain data at QPSK-2/3 followed by a three sub-channels at 8PSK-8/9.

Different consumers could be sent data at different modulation and codepoints depending on their operating signal to noise ratios. Each sub-channel or queue block 508 of the forward channel 504 is destined for a particular subscriber terminal 120 and is denoted by an arrow within the larger arrow of the forward channel 504. Arrows of different sizes convey the differences in coding and modulation that can be done for each sub-channel 508.

Various other coding and modulation schemes may be employed by the embodiments of the invention. For example, the feeder or service links may be spread spectrum signals. The links may also employ, for example, TDM, TDMA, CDMA, SCDMA, FDM, OFDM, WDM, FHSS, DSSS, or similar multiplexing or channel access schemes.

Figure 7:
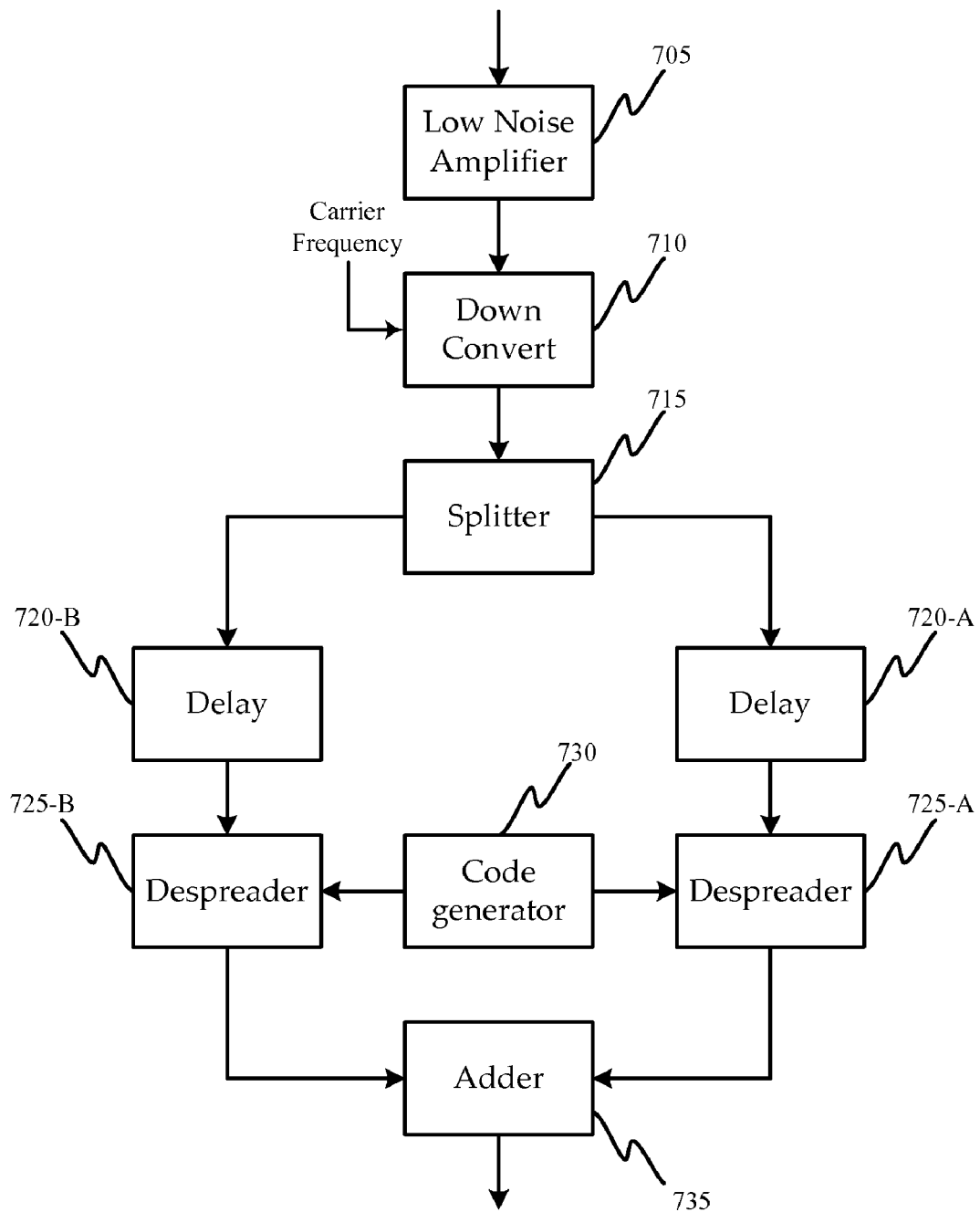
FIG. 7 is a block diagram depicting a method for combining composite signals received from an antennas at the gateway according to one embodiment of the invention.

FIG. 7 is a block diagram depicting a method for combining like polarized signals from an antenna at the gateway according to one embodiment of the invention. Referring back to FIG. 1B, the gateway receives right-hand polarized signals from at least two satellites through one antenna and left-hand polarized signals from at least two satellites. The signals, while sent during the same polarization at transmission, may be delayed relative to each other from the different path lengths traveled to the antenna. The two signals may be combined, for example, using a RAKE receiver. The receiver may first amplify the received signal with a low noise amplifier at block 705. This amplified signal may then be down converted at block 710. The down converter may, for example, use a mixer to combine the signal with a signal from a local oscillator. The signals may be separated at block 715 using, for example, a RAKE receiver. RAKE receivers are well known in the art. The rake receiver may simply determine the delay between the two signals. In some embodiments, the RAKE receiver may use test codes to find the path delay.

One or both of the signals may then be delayed in order to line up the two signals in time at block 720. If the signals are coded using, for example, direct sequence spread spectrum codes or the like, then the respective signals may be despread at block 725 using, for example a code generator 730. In other embodiments, each signal may be demodulated or decoded depending on the modulation scheme used by the system. For example, if the signals are modulated with OFDM the signals may be demodulated using a Fast Fourier transform. Once despread or demodulated the signals may be added at block 735. In one embodiment, the adder 735 may use equal gain combining where each signal is added with equal weight. In another embodiment the signals may be added using maximal ratio combining. The signals may be combined based on the Signal-to-Noise Ratio (SNR) of the combined output.

Figure 8:
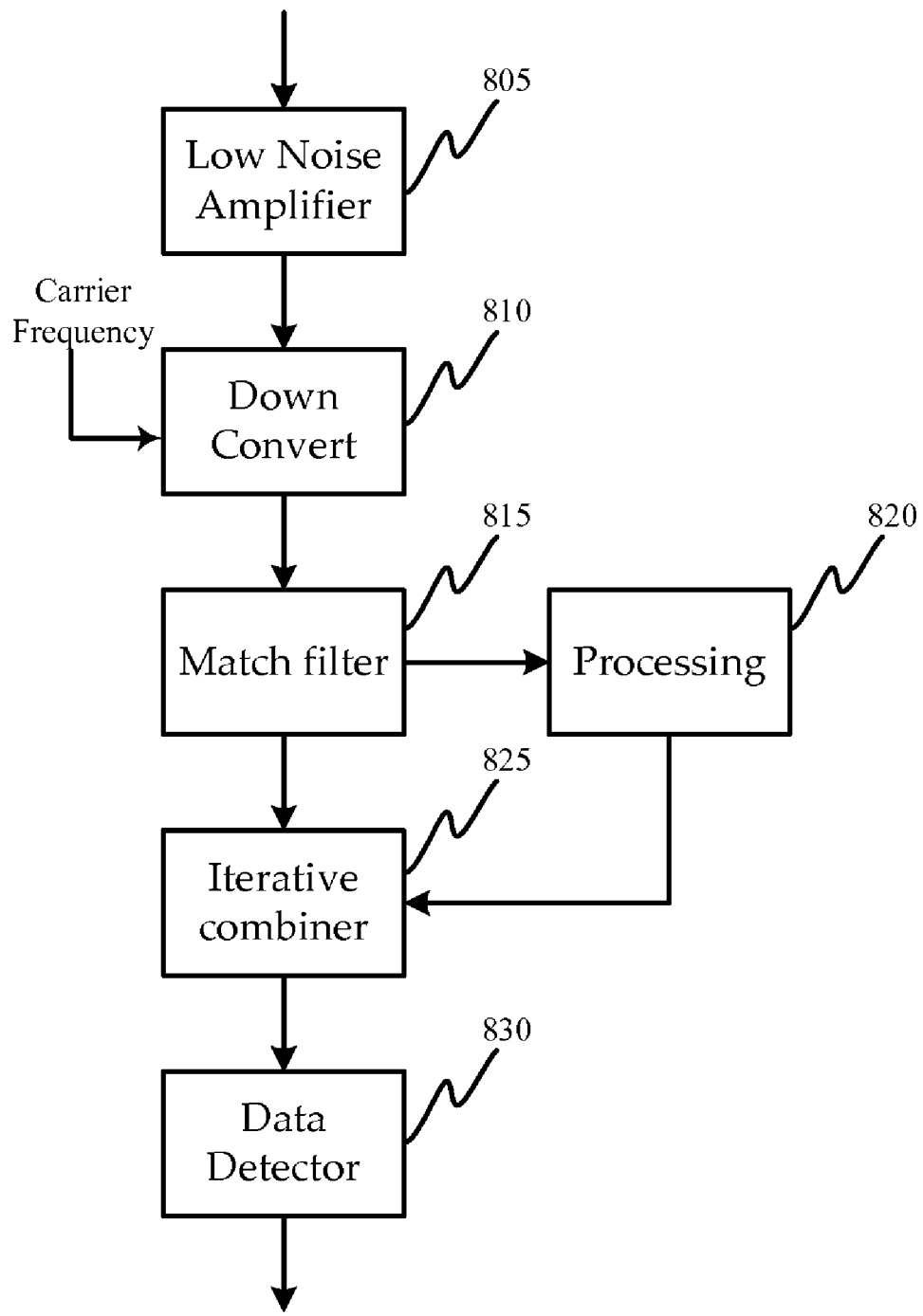
FIG. 8 shows a block diagram of a method for iteratively combining composite signals received from an antenna at the gateway according to another embodiment of the invention.

FIG. 8 is a basic block diagram of an example receiver structure 800 suitable for processing a signal comprising contributions from individual signals transmitted from satellites 110-A and 110-B in FIG. 1B. The structure 800 comprises a low noise amplifier (LNA) 804, a down converter (DC) 886, a match filter (MF) 808, an iterative combiner (IC) 810, a processing block (PHASE TIME AMP) 812, and a data detector (DETECT) 814. An antenna 802 accepts a composite signal to be processed by receiver structure 800. In other implementations, input 802 may simply be a port through which the composite signal is delivered from another device. Low noise amplifier 804 amplifies the composite signal and down convert 806 brings the signal down to baseband. The signal, now complex, is filtered by an appropriate match filter 808 and sampled at the rate of once per symbol. The result is a sampled complex output z(n), which is presented to iterative combiner 810 and also presented to processing block 812.

Processing block 812 estimates the phase, time, and amplitude of the various signal path components. The phase and amplitude estimates are represented as $w_l$'s, while the time estimates of the path delay are represented as $\tau_l$'s in the discussion that follows. For a composite signal comprising contributions from L individual signals transmitted over different paths, processing block 812 generates an estimate of $w_l$ and an estimate of $\tau_l$ for each one of the L individual signals. In the embodiment shown in FIG. 1B, L=2. Processing block 812 can be implemented in numerous ways. For example, one technique would be to use an autocorrelation of the received signal and the differently received components will appear as correlation peaks separated in time by the delay spread of the received signal components.

Iterative combiner 810 uses the $w_l$'s and $\tau_l$'s generated by processing block 812 to process the sampled complex output z(n), to produce estimates of the received sequence. Finally, the estimates of the received sequence can be used by detector 814 to create the data stream out of the receiver. Operations of receiver structure 800, especially those of iterative combiner 810 and detector 814, are described in more detail in subsequent sections. U.S. Pat. No. 7,206,364 titled "Iterative Diversity Reception" filed Feb. 14, 2006 by Mark J. Miller further describes various iterative combining techniques and is incorporated herein by reference for all purposes. Various other iterative combining techniques or similar techniques may also be used.

Figure 9:
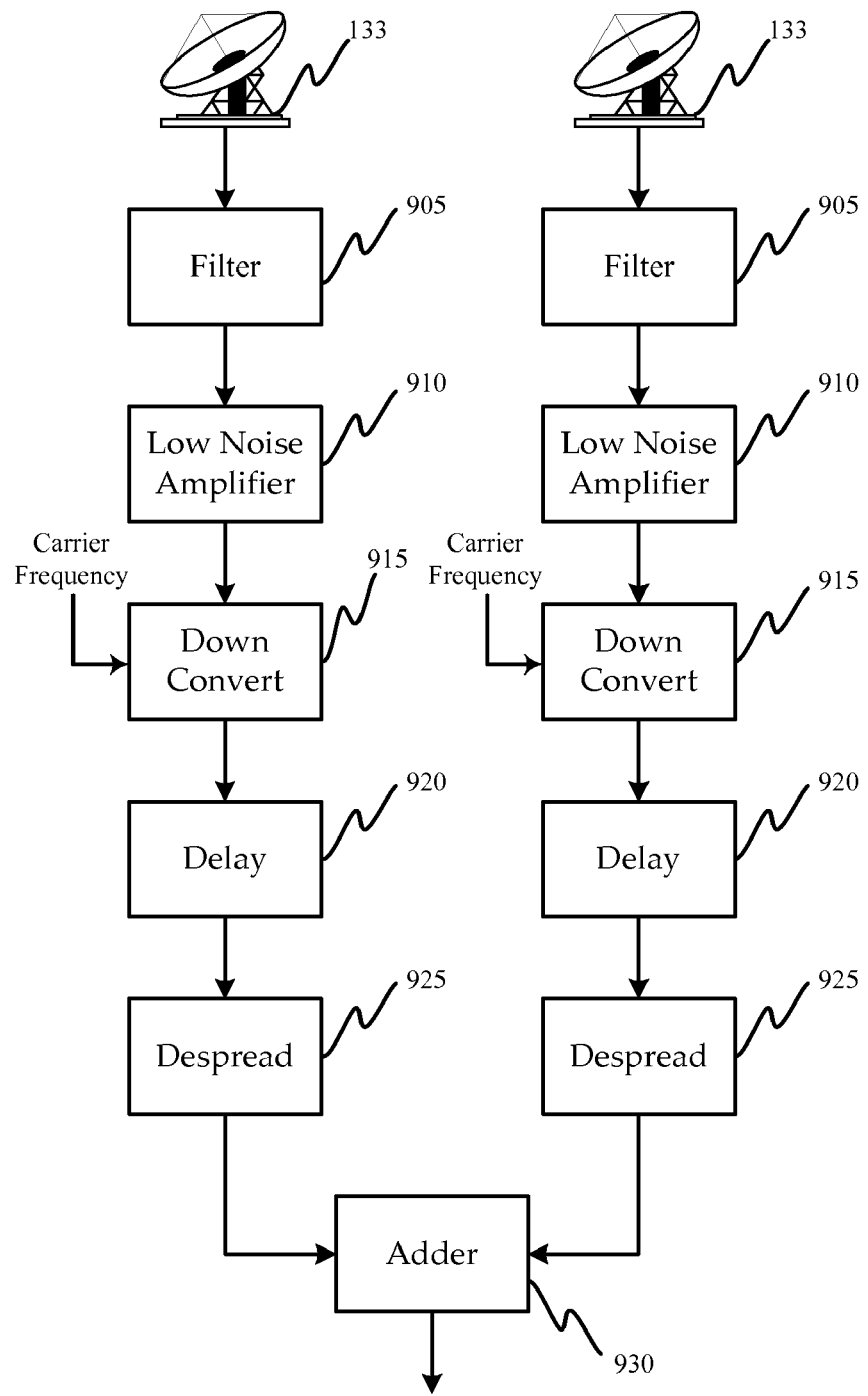
FIG. 9 shows a method for combining signals received from two separate antennas according to another embodiment of the invention.

FIG. 9 shows a signal combiner according to another embodiment of the invention. The combiner shown in FIG. 9 may be used with the four antenna gateway embodiment shown in FIG. 3. Each signal is received at two different antennas from two different satellites. FIG. 9 shows two such antennas 133. The antennas 133 may receive only right or left-hand polarized signals from two separate satellites. Once received, each signal passes through a filter and a low noise amplifier at blocks 905, 910. Each signal is then down converted at block 915. A delay between the signals may be added following the down conversion at block 920. Correlation methods may be used to determine the delay. Test signals may be used to correlate the two signals and provide the proper delay. Once the delay is known, one or both signals may be shifted in time in order to align with the other signal, whereupon the signals may optionally be despread at block 925 prior to combing the signals. are combined at block 930.

A soft addition, equal gain combining, maximal ratio combining or the like may be used at the adder.

While embodiments of the invention have described only two satellites in communication with two groups of subscriber terminals and a gateway more than two satellites may be employed. For example, 3, 4, 5, 6, 7 or 8 satellites may be used. The satellites may be in neighboring orbital slots or share the same orbital slot. Each of the satellites my provide polarized and orthogonally polarized signals. In other embodiments, the satellites may provide more than two orthogonal links.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

While the principles of the disclosure have been described above in connection with specific apparatuses and methods, it is to be clearly understood that this description is made only by way of example and not as limitation on the scope of the disclosure.

What is claimed is:

1. A satellite communication system comprising:
a gateway;
a first satellite configured to receive polarized signals from a first plurality of users and orthogonally polarized signals from a second plurality of users; transmit the polarized signals and the orthogonally polarized signals to the gateway, receive first feeder signals from the gateway, and transmit the first feeder signals to the first plurality of users; and
a second satellite configured to receive polarized signals from the first plurality of users and orthogonally polarized signals from the second plurality of users, transmit the polarized signals and the orthogonally polarized signals to the gateway, receive second feeder signals from the gateway, and transmit the second feeder signals to the second plurality of users.

2. The satellite communication system according to claim 1, wherein the first satellite and the second satellite orbit within the same orbital slot.

3. The satellite communication system according to claim 1, wherein the first satellite and the second satellite orbit within different orbital slots.

4. The satellite communication system according to claim 1, wherein the gateway includes a first antenna configured to receive the polarized signals from the first satellite and the second satellite, and a second antenna configured to receive the orthogonally polarized signals from the first satellite and the second satellite.

5. The satellite communication system according to claim 1, wherein the gateway includes: a first antenna configured to receive the polarized signals from the first satellite; a second antenna configured to receive the orthogonally polarized signals from the first satellite; a third antenna configured to receive the polarized signals from the second satellite; and a fourth antenna configured to receive the orthogonally polarized signals from the second satellite.

6. The satellite communication system according to claim 1, wherein the polarized signals are left-hand polarized and the orthogonally polarized signals are right-hand polarized.

7. The satellite communication system according to claim 1, wherein the polarized signals are right-hand polarized and the orthogonally polarized signals are left-hand polarized.

8. The satellite communication system according to claim 1, wherein the polarized signals and the orthogonally polarized signals comprise spread spectrum signals.

9. The satellite communication system according to claim 1, wherein the first feeder signals are multiplexed using time division multiplexing and the second feeder signals are multiplexed using time division multiplexing.

10. The satellite communication system according to claim 1, wherein the polarized signals are multiplexed using spread spectrum techniques.

11. The satellite communication system according to claim 1, wherein the orthogonally polarized signals are multiplexed using spread spectrum techniques.

12. A gateway comprising:
a first antenna configured to receive polarized signals from both a first satellite and a second satellite, and configured to transmit signals to the first satellite; and
a second antenna configured to receive orthogonally polarized signals from both the first satellite and the second satellite, and configured to transmit signals to the second satellite.

13. The gateway according to claim 12, wherein first antenna is configured to transmit signals to a first plurality of users through the first satellite.

14. The gateway according to claim 12, wherein second antenna is configured to transmit signals to a second plurality of users through the second satellite.

15. The gateway according to claim 12, wherein the first and second satellites are in the same orbital slot.

16. The gateway according to claim 12, wherein the first and second satellites are in different orbital slots.

17. A gateway comprising:
a first antenna configured to receive polarized signals from a first satellite;
a second antenna configured to receive orthogonally polarized signals from the first satellite;
a third antenna configured to receive polarized signals from a second satellite; and
a fourth antenna configured to receive orthogonally polarized signals from the second satellite;
wherein one or the other or both of the first antenna and third antenna transmit feeder signals to the first satellite and one or the other or both of the second antenna and fourth antenna transmit feeder signals to the second satellite.

* * * * *